UNITED STATES PATENT OFFICE.

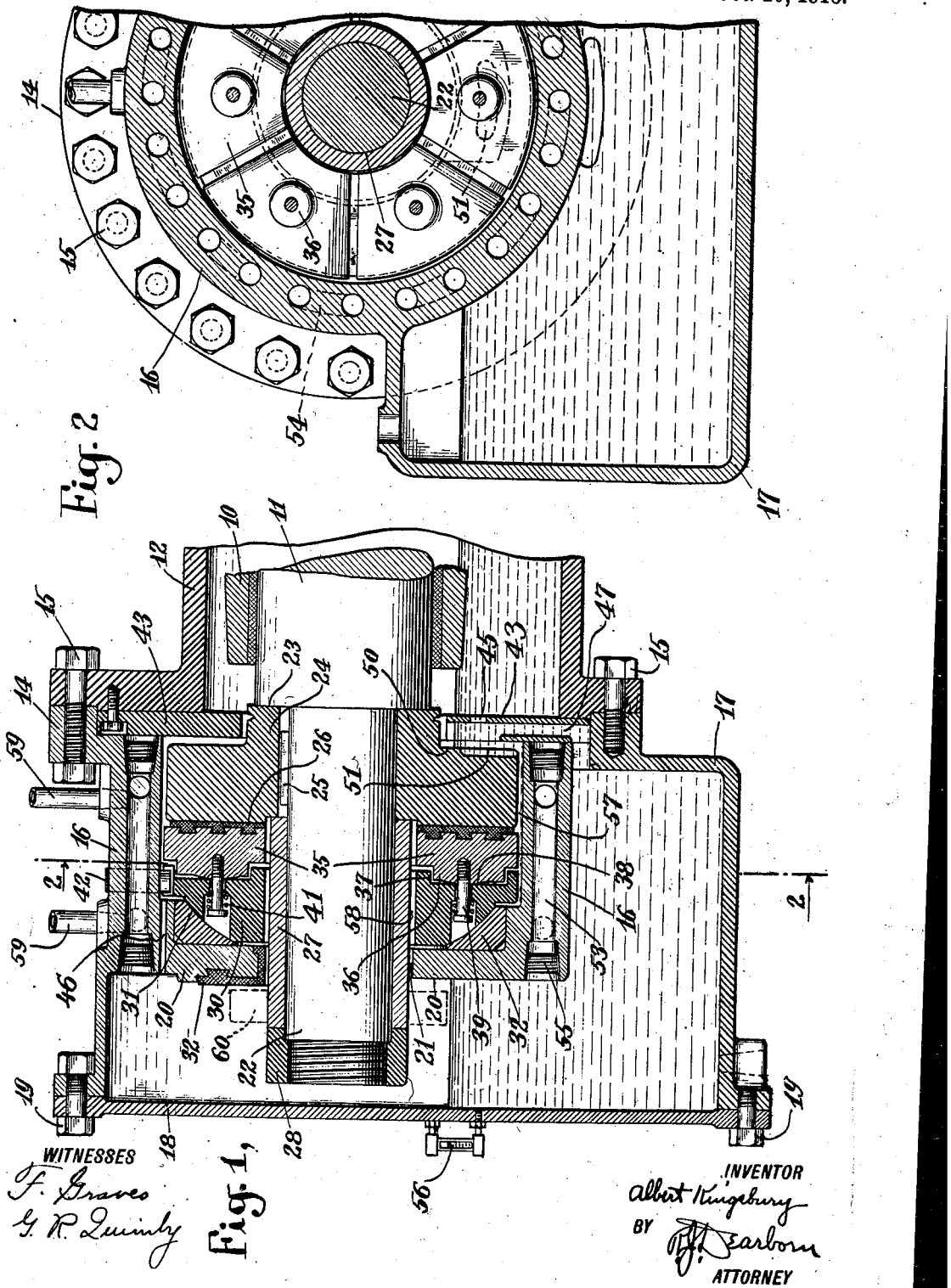

ALBERT KINGSBURY, OF PITTSBURGH, PENNSYLVANIA.

HORIZONTAL-THRUST BEARING.

1,201,057.

Specification of Letters Patent.

REISSUED

Patented Oct. 10, 1916.

Application filed March 26, 1913. Serial No. 756,839.

*To all whom it may concern:*

Be it known that I, ALBERT KINGSBURY, a citizen of the United States, and a resident of Pittsburgh, in the county of Allegheny and State of Pennsylvania, have invented certain new and useful Improvements in Horizontal-Thrust Bearings, of which the following is a specification; reference being had to the accompanying drawings, forming a part thereof.

My invention relates to fluid lubricated bearings and has special reference to bearings which are adapted to sustain the end thrust of horizontal shafts.

I prefer to embody my invention in a bearing of the general type shown and described in Patent No. 947,242 issued January 25th, 1910, on an application filed by me on May 20th, 1907, although I do not intend to limit my invention to any specific structure.

One object of my invention is to provide a bearing of the class above indicated that shall embody automatic means for supplying a flood or bath of oil or other lubricating fluid to the contacting surfaces without resorting to independent pumping devices.

Another object is to provide a thrust bearing of the shoe type that shall be adapted to sustain large horizontal thrust pressures and to automatically establish and maintain an oil film between each of the bearing shoes and its opposed bearing surface.

Other objects will be hereinafter set forth.

I will describe my invention in the following specification and point out the novel features thereof in appended claims.

Referring to the drawings—Figure 1 is a view in longitudinal section of a bearing constructed in accordance with and embodying my invention. The same bearing is shown in Fig. 2 which is a transverse sectional view on the line 2—2 of Fig. 1.

10 is a bearing in which a horizontal shaft 11 is supported. This bearing may be of any suitable structure and since it forms no part of my invention, it is not shown or described in detail.

12 is a stationary housing and is provided with a flange to which a housing 14 of my improved thrust bearing is secured by bolts 15. The housing 14 comprises a hollow cylindrical body 16 and a substantially rectangular oil well 17, a portion of which is integral therewith, an end plate 18 being secured to the housing by bolts 19 and constituting a removable retaining wall of the oil chamber. The hollow cylindrical body 16, hereinafter referred to as the cylinder 16, has a head 20 provided with a central opening 21 through which an extension 22 of the shaft 11 projects. Mounted on the shaft extension against a shoulder 23 is a collar 24 which is held against rotation by a spline 25 and has an annular thrust bearing surface 26. The collar is clamped against the shoulder by a sleeve 27 and a nut 28 which is screwed onto the end of the shaft extension.

An annular support or base ring 30 has a spherically curved surface 31 and is seated on an equalizing washer 32 which is fitted into the end of the cylinder 16 against the head 20. Radial bearing shoes 35 are tiltingly supported in the cylinder 16 upon the base ring 30 and are arranged to engage the bearing surface 26 of the collar 24. Each shoe has a projection 36 which fits loosely into an annular groove 37 of the base ring and a curved seat 38. It is thus prevented from rotating on its seat and is free to tilt in operation and assume a slightly inclined position relative to the bearing surface of the collar. The shoes are held in place by bolts 39 which extend loosely through suitable holes in the base ring and are screwed into the shoes, the holes being countersunk to admit the heads of the bolts and springs 41 being interposed under the heads. The bolts do not prevent the tilting of the shoes. A plug 42 extends through the cylinder wall into a notch in the base ring, but any other suitable means for preventing the rotation of the ring may be used. The ring automatically assumes such a position as to equalize the pressure on the shoes.

Secured to the left hand end of the housing 12 is a partition which is in the form of a ring 43 and loosely surrounds the hub of the collar 24. At the bottom of the ring 43 a cored passage 47 communicates with the oil well 17 at the bottom and opens into the cylinder at the back of the thrust collar 24. The opening 45 in the ring 43 is arranged to equalize the oil level in the housing 12 and the well 17.

The back radial surface 50 of the thrust collar may be provided with radial grooves 51, in order to form shallow veins or blades, for the purpose of enhancing the oil pumping action as hereinafter explained, or projections may be secured to the surface 50 for the same purpose, but neither of these expedients is essential to the operation of the bearing.

The walls of the cylinder 16 are preferably made relatively thick and are provided with means such as for example a plurality of longitudinal holes 53 which are connected alternately at opposite ends by passages 54 to provide a zigzag or tortuous path for water or other suitable cooling liquid, the ends of the holes 53 being closed by plugs 55.

The operation of the bearing is as follows: Assuming that as indicated in the drawings, the oil level is maintained at, or slightly above the opening 45 (this level may be indicated outside of the housing by an oil column 56 or other suitable means) oil will be forced, when the shaft 11 and the collar 24 are rotating, radially outward along the surface 50 of the collar by reason of the centrifugal forces which act upon it. Thus the oil is forced through a thin annular space 57 into the cylinder 16, flooding the bearing surfaces and filling all the spaces which are provided between the shoes 35, between the shoes and the base ring 30, and between the base ring and the equalizing ring 32. The oil is discharged through an annular passage 58 and out of the restricted opening 21 into the oil well 17. A small hole 46 permits the escape of any air that might otherwise accumulate in the upper part of the cylinder 16.

The cooling arrangement is particularly effective in reducing the temperature of the oil since the annular chamber 57 is thin and contains only a small quantity of oil at a time. This small quantity of oil is distributed over the relatively large inner surface of the cylinder 16, the temperature of the cylinder being held at a determined or desired value by the cooling water which is supplied to and discharged from the zigzag passage hereinbefore described, through pipes 59. Not only is the cooling system efficient by reason of the fact that the oil is spread over a large cooling surface but also because the oil is circulated rapidly over the cooling surface.

The opening 45 may obviously be closed without affecting the operation of the bearing but by connecting the oil well 17 to the housing 12, a larger body of oil is available and consequently the oil level is subject to less variation in height.

A check collar 60, shown in broken lines in Fig. 1, may be mounted on the sleeve 27 if desired.

Variations in size and arrangement of parts may be effected within the spirit and scope of my invention and I only intend to be limited by the appended claims.

What I claim is:

1. A thrust bearing comprising a rotatable thrust member having a radial oil-throwing surface and a bearing surface, stationary bearing members coöperating with the bearing surface of the rotatable member, an annular oil chamber surrounding the bearing members and closely adjacent to the oil-throwing and circumferential surfaces of the rotatable member, and an oil containing reservoir for supplying oil to the oil-throwing surface, said chamber having an outlet near the axis and adjacent to the stationary bearing members.

2. A thrust bearing comprising a rotatable thrust member having a radial oil-throwing surface on one side and a bearing surface on the other, stationary bearing members coöperating with the bearing surface of the rotatable member, an annular oil chamber surrounding the bearing members, closely adjacent to the oil-throwing and circumferential surfaces of the rotary member, and having an inlet opening opposite the oil-throwing surface, and an outlet opening near the axis.

3. A horizontal bearing comprising a rotatable thrust collar having an oil-throwing surface on one side and a bearing surface on the other, stationary bearing shoes engaging a relatively large proportion of the bearing surface of the thrust collar, an annular oil chamber surrounding the bearing members, closely adjacent to the oil-throwing and circumferential surfaces of the rotary member, and having an inlet opening opposite the oil-throwing surface, and an outlet opening near the axis opposite the stationary bearing members, whereby oil automatically forced into the chamber through the confined spaces escapes through the outlet opening.

4. A thrust bearing comprising a rotatable thrust member having a radial oil-throwing surface on one side and a bearing surface on the other, stationary bearing members coöperating with the bearing surface of the rotatable member, an oil containing reservoir, an annular oil chamber surrounding the bearing members, closely adjacent to the oil-throwing and circumferential surfaces of the rotary member, and having an outlet near the axis and on the same side of the thrust member as the stationary bearing members, and means for cooling the chamber adjacent to the restricted circumferential opening.

5. A horizontal bearing comprising a rotatable thrust collar having an oil-throwing surface on one side and a bearing surface on the other, stationary bearing shoes engaging a relatively large proportion of the bearing surface of the thrust collar, an annular oil chamber surrounding the bearing members, closely adjacent to the oil-throwing and circumferential surfaces of the rotary member, and having an inlet opening in the chamber opposite the oil-throwing surface, and an outlet opening near the axis opposite the stationary bearing members, whereby oil automatically forced into the chamber through the confined spaces escapes through the outlet opening, and means for cooling the chamber adjacent to the restricted circumferential opening.

In witness whereof, I have hereunto set my hand this 24th day of March in the year 1913.

ALBERT KINGSBURY.

Witnesses:
M. C. MERZ,
B. B. HINES.